(12) United States Patent
Hong et al.

(10) Patent No.: US 11,504,580 B2
(45) Date of Patent: Nov. 22, 2022

(54) POSTURE COACHING SYSTEM AND METHOD FOR WEIGHT TRAINING BY MOTION PATTERN

(71) Applicants: Junho Hong, Seoul (KR); Yoon Jin Kim, Seoul (KR)

(72) Inventors: Junho Hong, Seoul (KR); Yoon Jin Kim, Seoul (KR)

( * ) Notice: Subject to any disclaimer, the term of this patent is extended or adjusted under 35 U.S.C. 154(b) by 594 days.

(21) Appl. No.: 16/555,851

(22) Filed: Aug. 29, 2019

(65) Prior Publication Data

US 2020/0206568 A1 Jul. 2, 2020

(30) Foreign Application Priority Data

Dec. 27, 2018 (KR) .................. 10-2018-0170265

(51) Int. Cl.
*A63B 24/00* (2006.01)
*A63B 21/072* (2006.01)

(52) U.S. Cl.
CPC ........ *A63B 24/0006* (2013.01); *A63B 21/072* (2013.01); *A63B 24/0062* (2013.01); *A63B 2024/0012* (2013.01); *A63B 2024/0068* (2013.01); *A63B 2208/02* (2013.01); *A63B 2220/10* (2013.01); *A63B 2220/34* (2013.01); *A63B 2220/40* (2013.01); *A63B 2220/833* (2013.01)

(58) Field of Classification Search
CPC .............. A63B 24/0006; A63B 21/072; A63B 24/0062; A63B 2024/0012; A63B 2024/0068; A63B 2208/02; A63B 2220/10; A63B 2220/34; A63B 2220/40; A63B 2220/833; A63B 2220/16; A63B 2220/20; A63B 2220/803; A63B 2220/836; A63B 2220/89; A63B 2225/50; G09B 19/0038; A61B 5/1116; A61B 5/1121; A61B 5/7264; A61B 2562/0219
See application file for complete search history.

(56) References Cited

U.S. PATENT DOCUMENTS

| | | | | |
|---|---|---|---|---|
| 2003/0226695 | A1* | 12/2003 | Mault | A61B 5/0002 128/921 |
| 2015/0081057 | A1* | 3/2015 | Hamada | A63B 21/00181 700/91 |
| 2019/0224529 | A1* | 7/2019 | Jung | A61B 5/112 |
| 2020/0101352 | A1* | 4/2020 | Liu | A63B 21/0442 |

FOREIGN PATENT DOCUMENTS

| | | |
|---|---|---|
| KR | 10-2015-0141213 A | 12/2015 |
| KR | 10-2017-0000985 A | 1/2017 |
| KR | 20-2018-0000709 A | 3/2018 |

* cited by examiner

*Primary Examiner* — Jeffrey S Vanderveen
(74) *Attorney, Agent, or Firm* — Wolter Van Dyke Davis, PLLC; Eugene J. Molinelli; Cian O'Brien

(57) ABSTRACT

Disclosed is a posture coaching method for weight training, which includes sensing an exercising motion of a user by a sensor module that is attached to a part of the body of the user or exercise equipment gripped by the user for exercising; calculating an inherent angle of the sensor module and a linear acceleration of each axis of a user-based coordinate system based on the user by using the sensed value; analyzing an exercising posture of the user by detecting and classifying a pattern of the linear acceleration and the inherent angle; and generating exercising posture correction data based on the classified pattern.

7 Claims, 18 Drawing Sheets

(a) (b)

FIG. 8
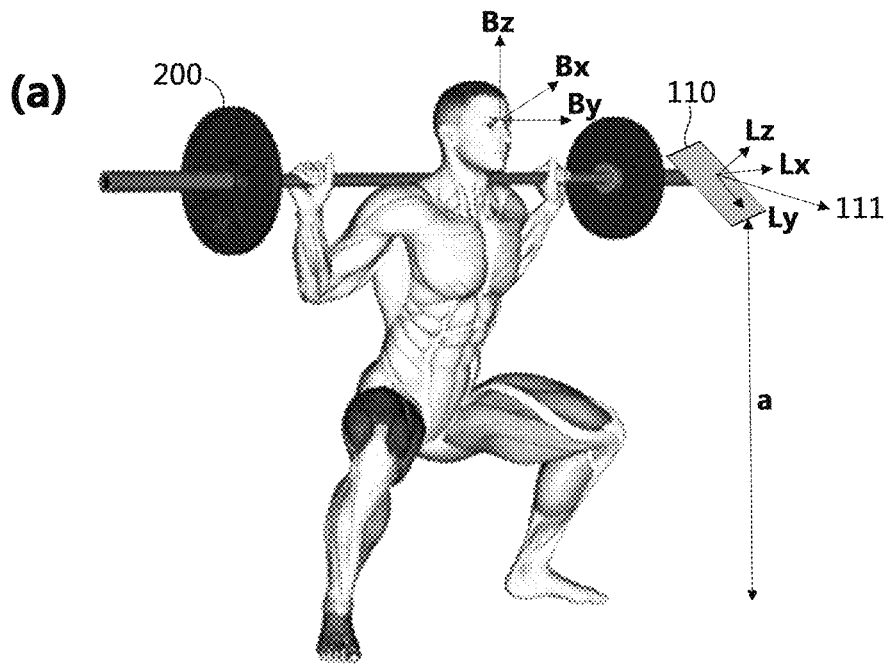
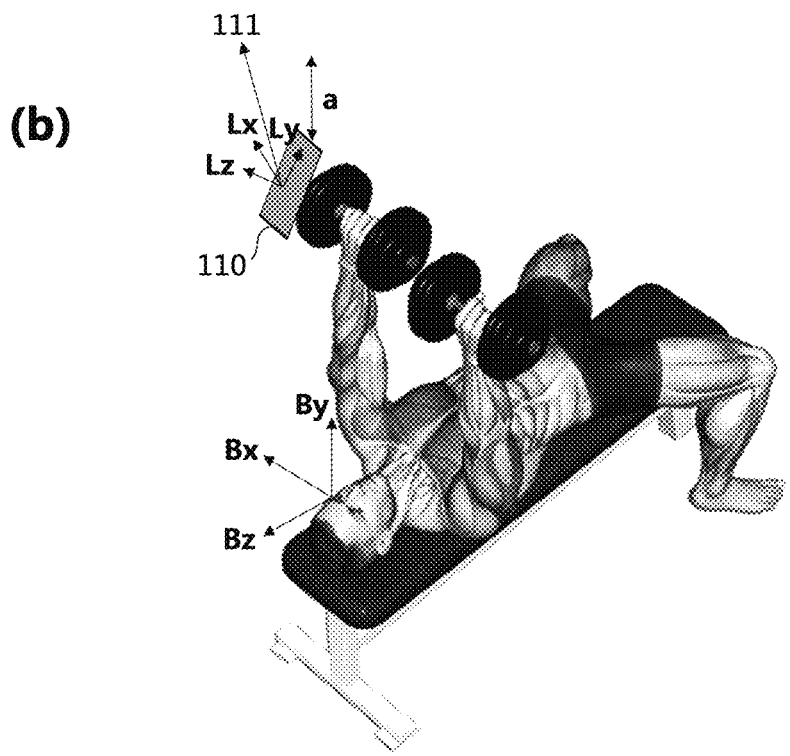

FIG. 11
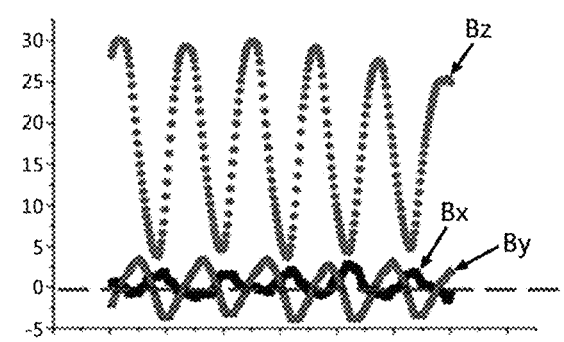
(a)
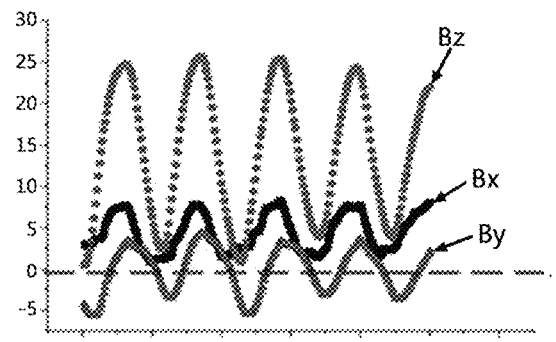
(b)
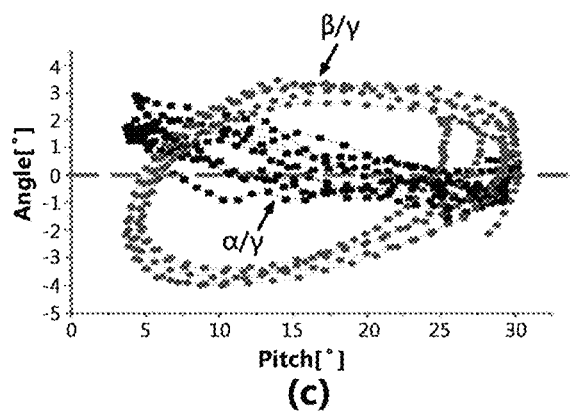
(c)
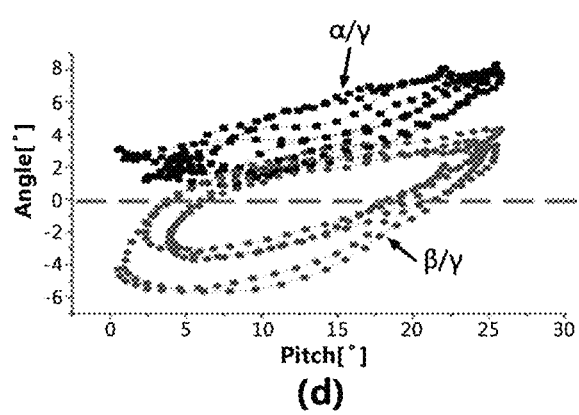
(d)

POSTURE COACHING SYSTEM AND METHOD FOR WEIGHT TRAINING BY MOTION PATTERN

TECHNICAL FIELD

The present application claims priority to Korean Patent Application No. 10-2018-0170265 filed on Dec. 27, 2018 in the Republic of Korea, the disclosures of which are incorporated herein by reference.

The present disclosure relates to a posture coaching system and method for weight training by a motion pattern, and more particularly, to a posture coaching system and method for weight training by a motion pattern, which may improve the accuracy of an exercising motion by analyzing a weight training posture pattern to find the cause of an abnormal posture and coaching a user in real time according to the analysis result.

BACKGROUND ART

In recent years, more and more people use the fitness center and home training to improve their strength or health. In particular, weight training using barbell, which requires a very sophisticated motion as a number of joints and muscles are used to improve the muscle strength, is gaining popularity. However, the weight training motion using a barbell may cause injury to muscles or joints and body imbalance unless the proper weight training motion is performed with an appropriate exercising posture.

Thus, it is important to learn the correct weight training motion with the help of experts through personal training. However, the majority of people are reluctant to personal training because of high cost, location or time constraints and professional level deviations. For this reason, the importance of controlling precise motions when performing weight training is steadily pointed out, but it is not practiced properly.

Accordingly, researches on smart exercise assisting devices and systems for personal exercise are actively progressing. However, there are also various technical limitations such as high cost burden, inaccuracy caused by a recognition error or an error caused by clothes, or limited recognition only to the front.

DISCLOSURE

Technical Problem

The present disclosure is directed to providing a posture coaching system and method for weight training by a motion pattern, which may identify the cause of an abnormal posture by analyzing the motion pattern according to an exercise type of a user to check and evaluate the correct posture in real time.

The present disclosure is also directed to providing a posture coaching system and method for weight training by a motion pattern, which may improve the accuracy of the exercising motion by mapping a sensor data pattern of each abnormal posture with motion analysis data through machine learning.

The present disclosure is also directed to providing a posture coaching system and method for weight training by a motion pattern, which may give audiovisual notifications to enable an individual to perform accurate exercising motions without space and time constraints and expert assistance.

Technical Solution

In one aspect of the present disclosure, there is provided a posture coaching method for weight training, comprising: sensing an exercising motion of a user by a sensor module that is attached to a part of the body of the user or exercise equipment gripped by the user for exercising; calculating an inherent angle of the sensor module and a linear acceleration of each axis of a user-based coordinate system based on the user by using the sensed value; analyzing an exercising posture of the user by detecting and classifying a pattern of the linear acceleration and the inherent angle; and generating exercising posture correction data based on the classified pattern.

The sensor module may include a geomagnetic sensor, a gyro sensor and an acceleration sensor, and the step of calculating an inherent angle of the sensor module and a linear acceleration of each axis of a user-based coordinate system based on the user may include calculating the inherent angle based on a quaternion calculated based on sensor values measured by the geomagnetic sensor, the gyro sensor and the acceleration sensor.

Also, the sensor module may include a distance sensor, and the posture coaching method may further comprise calculating a distance from a reference surface based on the distance sensor; and detecting a distance pattern from the reference surface.

Also, the step of calculating an inherent angle of the sensor module and a linear acceleration of each axis of a user-based coordinate system based on the user may include calculating a front direction of the user according to an initial value sensed by the sensor module and deriving each axis of the user-based coordinate system based on the calculated front direction.

Also, the front direction may be derived to be present on a reference plane of a user-based coordinate system that is derived by the geomagnetic sensor.

Also, the front direction may be derived based on an exercise type input by the user and the sensed initial value.

Also, the step of analyzing an exercising posture of the user by detecting and classifying a pattern of the linear acceleration and the inherent angle may include sensing a first user exercising posture by a motion sensor and the sensor module; sensing a second user exercising posture by a motion sensor and the sensor module; obtaining a motion coefficient by calculating through a neural network the data collected in the steps of sensing the first and second user exercising postures by the motion sensor and the sensor module; and detecting and classifying a pattern of the linear acceleration and the inherent angle based on the motion coefficient.

Specific details of other embodiments are included in the detailed description and drawings.

Advantageous Effects

According to the present disclosure, it is possible to identify the cause of an abnormal posture by analyzing the motion pattern according to an exercise type of a user to check and evaluate the correct posture in real time.

According to the present disclosure, it is possible to improve the accuracy of the exercising motion by mapping a sensor data pattern of each abnormal posture with motion analysis data through machine learning.

According to the present disclosure, it is possible to give audiovisual notifications to enable an individual to perform accurate exercising motions without space and time constraints and expert assistance.

The effects of the present disclosure are not limited by the above, and more various effects are included in the specification.

DESCRIPTION OF DRAWINGS

FIG. 8 is a diagram for illustrating a process of deriving a front direction according to an embodiment of the present disclosure.

FIG. 11 is a diagram showing an example of an inherent angle and linear acceleration of each axis on a user-based coordinate system according to an embodiment of the present disclosure.

BEST MODE

The following merely illustrates the principles of the invention. Therefore, those skilled in the art may implement the principles of the invention and invent various devices included in the concept and scope of the invention, although not explicitly described or illustrated herein. In addition, all conditional terms and embodiments listed herein are in principle clearly intended only for the purpose of understanding the concept of the invention and are not to be limited to the specifically listed embodiments and states.

In addition, in the following description, ordinal expressions such as "first" and "second" are used to describe objects that are equivalent to and independent from each other, and the expressions such as "main and sub" or "master and slave" in their order should be understood to be meaningless.

The above objects, features, and advantages will become more apparent from the following detailed description in conjunction with the accompanying drawings, whereby the technical spirit of the invention may be easily implemented by those skilled in the art.

The features of various embodiments of the present disclosure may be combined with each other, in part or in whole, and may be technically associated and operated in various ways as fully understood by those skilled in the art, and the embodiments may also be implemented independently from each other or along with each other.

Hereinafter, various embodiments of the present disclosure will be described in detail with reference to the accompanying drawings.

Figure 1:
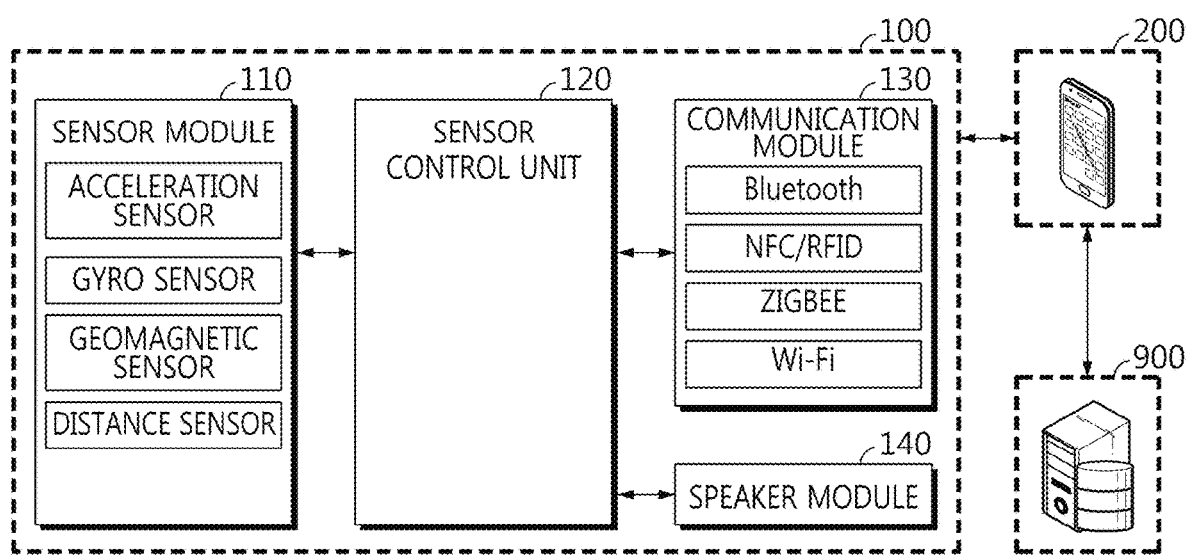
FIGS. 1 and 2 are diagrams showing a whole configuration of a posture coaching system for weight training according to an embodiment of the present disclosure.
Figure 2:
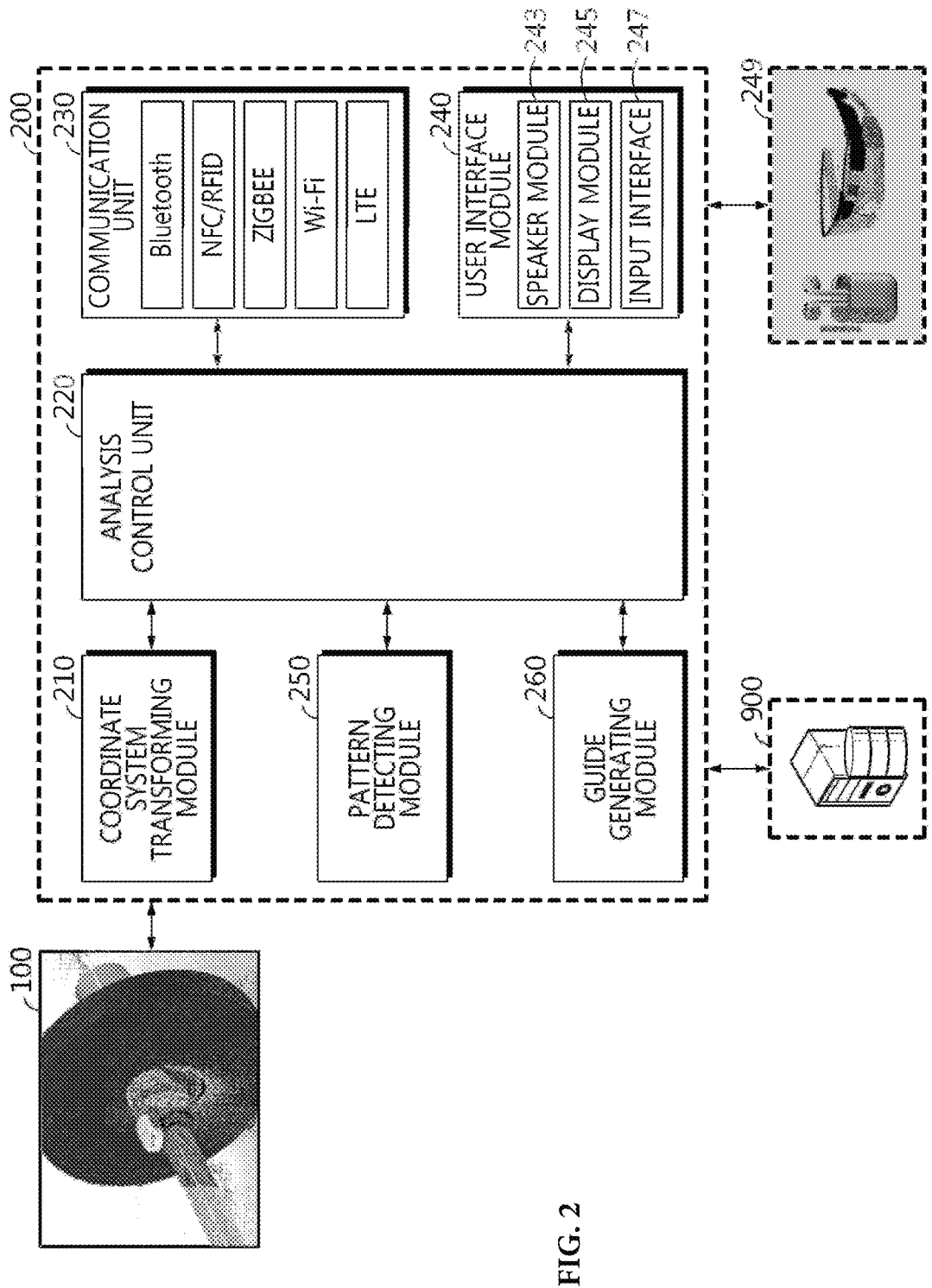
Figure 3:
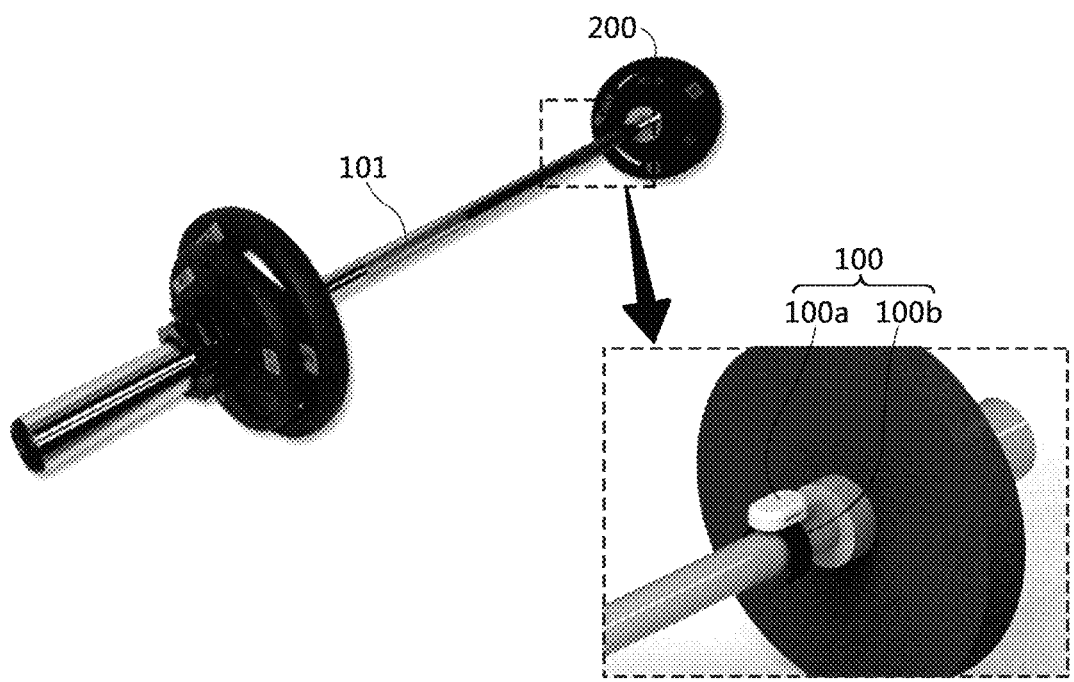
FIG. 3 is a diagram showing an example where a posture measuring module according to an embodiment of the present disclosure is installed.

FIGS. 1 and 2 are diagrams showing a whole configuration of a posture coaching system for weight training according to an embodiment of the present disclosure, and FIG. 3 is a diagram showing an example where a posture measuring module according to an embodiment of the present disclosure is installed.

Referring to FIG. 1, the posture coaching system for weight training by a motion pattern may include a posture measuring module 100, a posture analyzing module 200, and an analysis learning server 900. In this case, the posture measuring module 100 is attached to a part of the body of a user or exercise equipment used by the user such as a barbell to measure data on a weight training posture, and may include a sensor module 110, a sensor control unit 120, and a communication module 130.

In this embodiment, referring to FIG. 3, the posture measuring module 100 may be accommodated in a housing 100a separate from the posture analyzing module 200, and may be attached to or detached from a bar 101 of the barbell by means of a band-type fastening unit 100b. However, the present disclosure is not limited thereto, and the posture measuring module 100 may be attached to an exercise part in various ways. For example, the posture measuring module 100 may be attached not only to the barbell but also to the wrist, the ankle, the waist, and the like. Specifically, if it is determined that the movement and angle of a gripped portion may affect the exercising posture, the posture measuring module 100 may be mounted on the wrist. Also, if the movement and angle of the torso have a significant influence on the exercising posture or if it is determined that the exercise posture may be evaluated by tracking on the wrist, the posture measuring module 100 may be attached to the waist. In addition, if it is determined that the movement and angle of the lower limb may affect the exercise posture, the posture measuring module 100 may be attached to the ankle.

Figure 5:
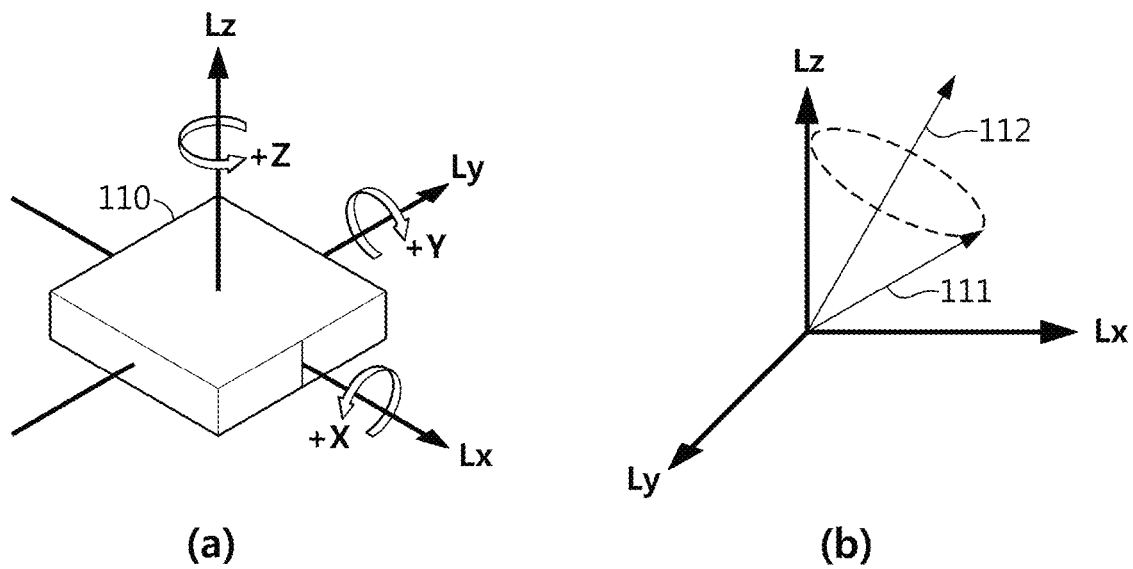
FIG. 5 is a diagram for illustrating a three-dimensional angle of a barbell according to an embodiment of the present disclosure.
Figure 6:
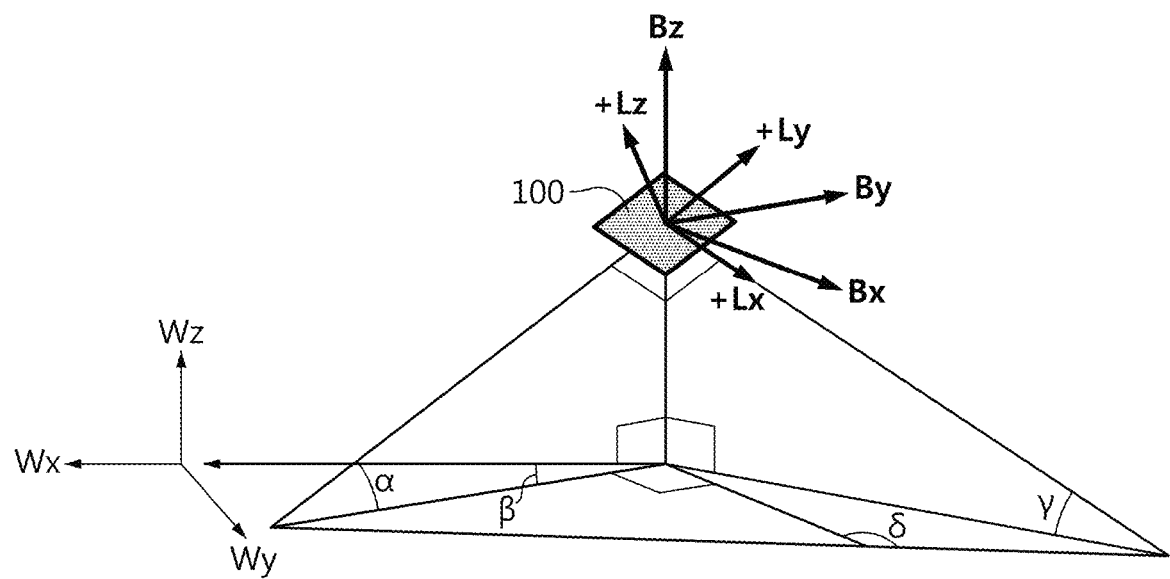
FIG. 6 is a diagram for illustrating an inherent angle and a user-based coordinate system according to an embodiment of the present disclosure.
Figure 7:
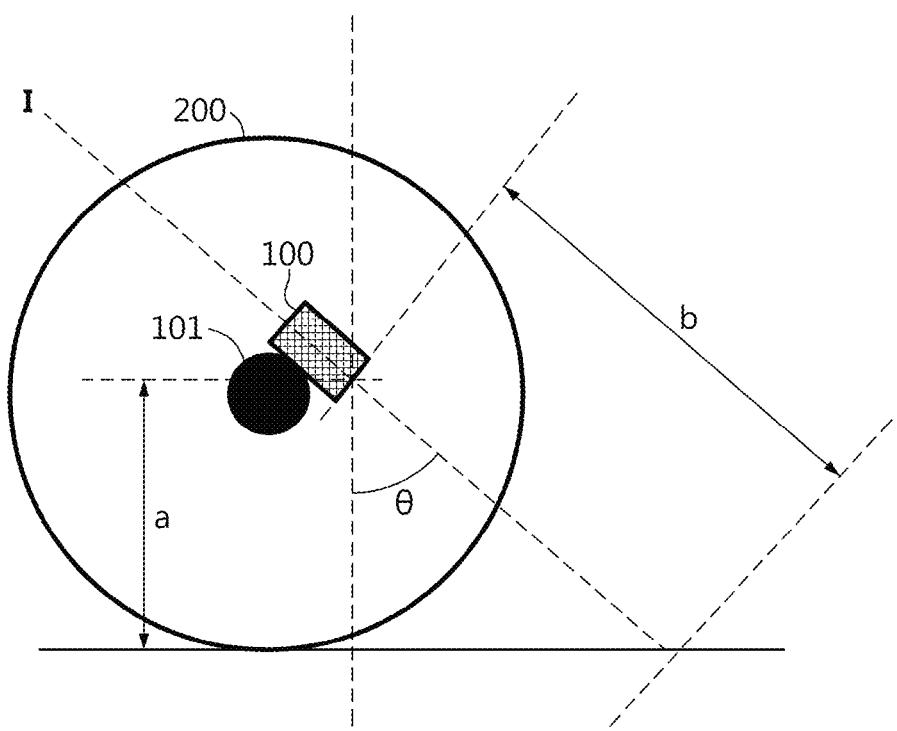
FIG. 7 is a diagram for illustrating a process of measuring a distance from a reference surface according to an embodiment of the present disclosure.

As shown in FIGS. 5 to 7, the sensor module 110 may measure a sensor value required for measuring a three-dimensional angle 111 (or, a quaternion) of the posture measuring module 100 and a distance from a reference surface (or, the ground) and transmit the sensor value to the posture analyzing module 200. For example, the sensor module 110 may include an acceleration sensor, a gyro sensor, a geomagnetic sensor, and the like and may measure an angular velocity, an acceleration and a geomagnetic field size required for calculating the three-dimensional angle (quaternion) as the sensor value by means of 6-axis or 9-axis synthesis. A specific measuring method will be described later.

The sensor control unit 120 may control the overall operation of the posture measuring module 100. If an additional calculation is required, the sensor control unit 120 may calculate, for example, the three-dimensional angle.

In this embodiment, it is just described that the posture measuring module 100 senses information necessary for calculating the inherent angle. However, the present invention is not limited thereto, and the inherent angle may also be calculated by the sensor control unit 120 and transmitted to the posture analyzing module 200.

The posture measuring module 100 according to the present disclosure may additionally include a speaker module 140 for transmitting simple voice information. In this case, if any one of the calculated inherent angles $\alpha$, $\beta$, $\gamma$, for example if the angle $\gamma$ at which the barbell is rotated (for example, a complementary angle by which the barbell rotates as the barbell is gripped by the user during squat) is out of a certain range, the speaker module 140 may regard this case as a poor grip posture and transmit a guide voice or a warning sound.

The sensor value measured by the sensor module 110 may be transmitted to the posture analyzing module 200 through the communication module 130. The communication module 130 may include, for example, Bluetooth, Near Field Communication (NFC), Radio-Frequency Identification (RFID), Zigbee module, Wi-Fi, or the like.

Meanwhile, the posture analyzing module 200 may calculate the inherent angles $\alpha$, $\beta$, $\gamma$, the accelerations Bx, By, Bz based on the user-based coordinate system and the distance (a) from the reference surface based on the sensor values obtained by the posture measuring module 100. In addition, the posture analyzing module 200 may detect a pattern of the inherent angles $\alpha$, $\beta$, $\gamma$, the accelerations Bx, By, Bz based on the user-based coordinate system and the distance (a) from the reference surface and generate guide information on the exercise posture based on the detected pattern.

The posture analyzing module 200 may be an application program, a software module or a hardware module installed in a mobile phone, a PC, a smart watch, smart glasses or a smart earphone. Preferably, the posture analyzing module 200 may be an application program executed in a processor of a mobile terminal, a personal computer, a glasses display device, and the like. The application program may be stored in a memory and executed by a processor.

In more detail, referring to FIG. 2, the posture analyzing module 200 may include an analysis control unit 220, a coordinate system transforming module 210, a pattern detecting module 250, a guide generating module 260, a communication unit 230, and a user interface module 240.

The analysis control unit may can manage the overall analysis control and process.

The coordinate system transforming module 210 may calculate the inherent angles $\alpha$, $\beta$, $\gamma$, the accelerations Bx, By, Bz based on the user-based coordinate system and the distance (a) from the reference surface based on the measured sensor values. Each calculation will be described later.

Meanwhile, the pattern detecting module 250 may detect an exercise pattern based on the inherent angles $\alpha$, $\beta$, $\gamma$, the accelerations Bx, By, Bz based on the user-based coordinate system and the distance (a) from the reference surface as described above and generate correction information for the exercise posture from the detected pattern. The inventors of this application have noted that, when performing weight training, the barbell angle, or the angle of a body part such as the arm, is patterned. Thus, if the exercise pattern is detected and analyzed, it is possible to know whether the body part is being exercised at the correct angle as compared in comparison to an exercise pattern of those who perform the correct exercise. This pattern detection algorithm will be described later in detail.

Meanwhile, the guide generating module 260 may generate guide information and provide the guide information to the user interface module 240 so that the user may immediately correct the exercising posture that is determined as a bad exercise posture by the above pattern comparison.

The communication unit 230 may receive the sensor value under the control of the analysis control unit 220 and transmit the coordinate generated by the coordinate system transforming module 210 and the pattern data obtained by the pattern detecting module 250 to the analysis learning server 900.

The user interface module 240 may provide guidance to the user when the exercising posture of the user determined in the posture analyzing module 200 is an abnormal posture. In addition, necessary information may be input by the user for analysis.

For example, as shown in FIG. 2, the user interface module 240 may include a speaker module 243 for providing auditory guidance information about an abnormal posture, a display module 245 for providing visual guidance information, and an input interface 247 such as a touch screen for receiving necessary information from the user. Although the user interface module 240 is illustrated as being included in the posture measuring module 200 in this specification, correction information may be output through a wireless earphone or a glasses display, separate from the posture measuring module 200.

The analysis learning server 900 receives and stores various information from the posture analyzing module 200, performs learning such as pattern classification, matching, etc. by machine learning means such as artificial neural network, and then loads the learning data on the posture analyzing module 200 so that posture analysis module 200 performs posture analysis.

In this case, the analysis learning server 900 may be implemented as one device physically along with the posture analyzing module 200 described above. For example, the posture analyzing module 200 may be implemented in a personal computer, and the analysis learning server 900 may also be implemented in the personal computer. Alternatively, the analysis learning server 900 may be implemented as a separate server at the outside of the posture analyzing module 200. The analysis learning server 900 may include a memory, a memory controller, at least one processor (CPU), a peripheral interface, an input/output (I/O) subsystem, a display device, an input device, and a communication circuit. The memory may include fast random access memory, and may also include at least one magnetic disk storage device, a nonvolatile memory such as a flash memory device, or other nonvolatile semiconductor memory device. The access to the memory by other components, such as processors and peripheral interfaces may be controlled by the memory controller. The memory may store various information and program instructions, and the program is executed by the processor. The peripheral interface connects the input/output peripherals with the processor and the memory. At least one processor executes a set of instructions stored in various software programs and/or the memory to perform various functions for the system and process the data. The I/O subsystem provides an interface between the I/O peripherals, such as a display device and an input device, and the peripheral interface.

Hereinafter, referring to FIGS. 4 to 13, a posture coaching method for weight training by a motion pattern according to an embodiment of the present disclosure will be described.

Figure 4:
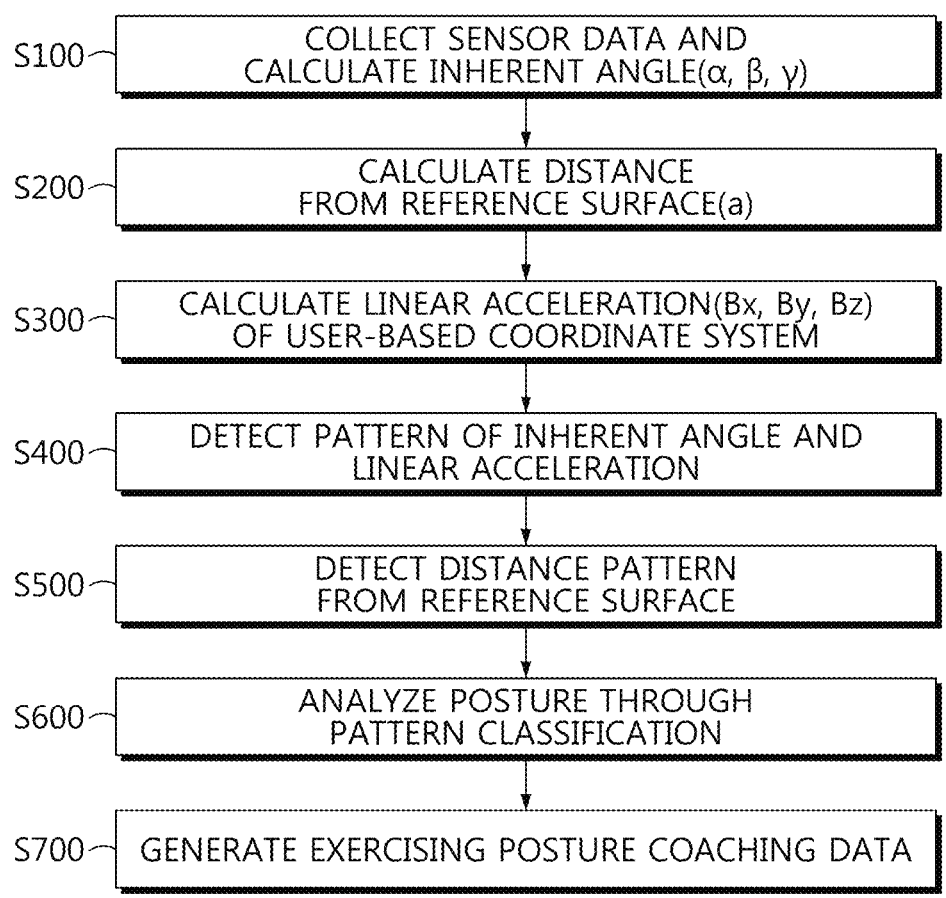
FIG. 4 is a flowchart for illustrating a posture coaching method for weight training according to an embodiment of the present disclosure.

FIG. 4 is a flowchart for illustrating a process of a posture coaching method for weight training by a motion pattern according to an embodiment of the present disclosure.

First, in Step S100, after the posture measuring module 100 measures and collects sensor values, the coordinate system transforming module 210 calculates the inherent angles α, β, γ of the posture measuring module 100 (for example, a barbell).

FIG. 5 is a diagram for illustrating a three-dimensional angle of a barbell according to an embodiment of the present disclosure, and FIG. 6 is a diagram for illustrating an inherent angle and a user-based coordinate system according to an embodiment of the present disclosure. Referring to FIG. 5, the sensor module 110 (for example, an IMU chip) basically has a sensor module coordinate system Lx, Ly, Lz, and, for example, may output a rotational acceleration and a linear acceleration of each axis according to the sensor module coordinate system Lx, Ly, Lz as the sensor value.

Referring to FIGS. 5 and 6, basically, the posture analyzing module 200 may calculate the inherent angles α, β, γ based on values of the sensor module coordinate system Lx, Ly, Lz. At this time, the inherent angle is an angle obtained by converting sensor values measured in the sensor module coordinate system Lx, Ly, and Lz into an angle based on a user-based coordinate system Wx, Wy, Wz based on the magnetic north direction and the gravity direction. For example, the inherent angles α, β, γ may refer to a sensor attachment angle α, a bar angle β of the barbell, and a body angle γ (for example, a complementary angle of the angle by which the barbell is rotated as the user grips the barbell during squat).

In order to calculate the inherent angle more easily, a three-dimensional angle 111 (quaternion) may be used. For example, referring to FIG. 5b, after the quaternion 111 is calculated based on the values measured in the sensor module coordinate system Lx, Ly, Lz, the inherent angle α, β, γ of the user-based coordinate system may also be obtained based on the calculated quaternion 111. At this time, the reference sign 112 in FIG. 5b denotes an axis of rotation.

Meanwhile, in Step S200, in order to further increase the accuracy of pattern analysis, the distance (a) from the reference surface may be additionally obtained using the distance sensor of the sensor module 110.

FIG. 7 is a diagram for illustrating a process of measuring a distance from a reference surface according to an embodiment of the present disclosure. Referring to FIG. 7, if the posture measuring module 100 is attached to the barbell, the posture measuring module 100 measures the distance (b) to the reference surface on the measuring module installation line I by using the distance sensor. In this case, through the calculation based on the measured distance (b) on the measuring module installation line and the barbell rotation angle θ, it is possible to calculate the shortest distance (a) from the reference surface such as the ceiling, floor, or wall. Here, the barbell rotation angle may be the complementary angle of any one of the inherent angles, for example γ.

Here, the measuring module installation line I may be understood as a line parallel to one side surface of the housing 100a in contact with the human body or the bar 101 of the barbell and passing through the distance sensor (e.g., a laser sensor). For example, the measuring module installation line I mean a line that performs a linear motion when a laser light is irradiated to move straightly and reflected from the reference surface to be received.

Meanwhile, in Step S300, the posture analyzing module 200 may calculate a linear acceleration Bx, By, Bz of each axis in the user-based coordinate system (B-frame) based on the inherent angles α, β, γ. The user-based coordinate system is a coordinate system set by the inventor of the present disclosure in order to accurately capture a real motion of the user and to compare the real motion with an exercising motion with other users. If the process relies only on the sensor module coordinate system Lx, Ly, Lz, it is not possible to compare the exercising motion between users because the values representing the motions vary depending on the place or mounting method.

FIG. 8 is a diagram for illustrating a process of deriving a front direction according to an embodiment of the present disclosure. Referring to FIG. 8, one axis (e.g., By) of the user-based coordinate system may be set as a direction perpendicular to the front surface (hereinafter, referred to as a front direction) by estimating the front surface as a surface faced by the user. As can be seen from FIG. 8b, depending on the exercise type, the initial value (the value when the exercise is initiated) of the quaternion 111 calculated from the coordinate axis of the sensor module coordinate system or the sensor value is located in a specific area according to the exercise type. Thus, the coordinate system transforming module 210 of the posture analyzing module 200 may determine in which region the initial value of the quaternion 111 calculated from the coordinate axis of the sensor module coordinate system or the sensor value exists and determine the exercise type.

Figure 9:
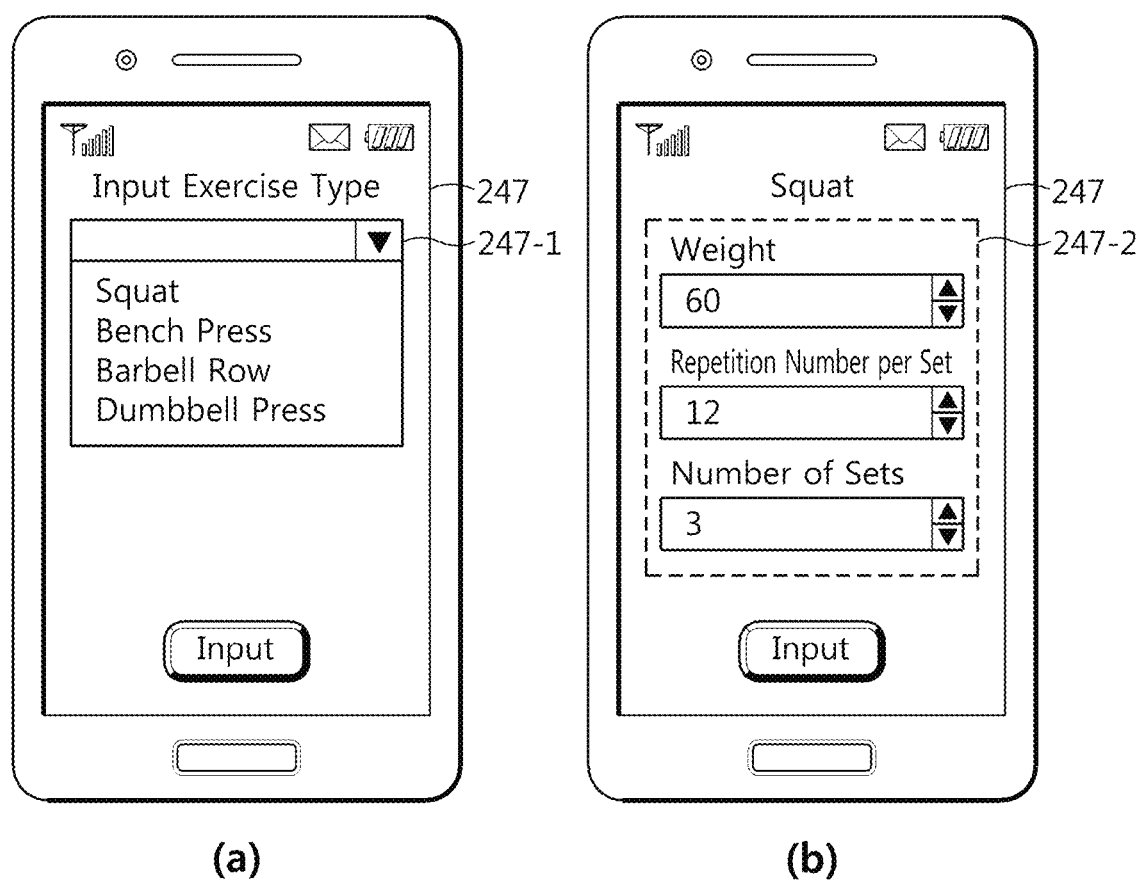
FIG. 9 is a diagram showing an input interface according to an embodiment of the present disclosure.

FIG. 9 is a diagram showing an input interface according to an embodiment of the present disclosure. Referring to FIG. 9, the exercise type may be determined by user input by the input interface 247. The input interface 247 may include a selection menu 247-1. If the user selects any one exercise type in the selection menu, the exercise type is determined according to the selection.

In addition, if the exercise type is determined, the front direction By may be determined according to the exercise type. For example, in the case of squat (FIG. 8a) and dumbbell pressing (FIG. 8b), the initial values of the quaternion 111 exist in different areas, and thus the front direction By may be determined. At this time, preferably, the front direction By is determined to be included in a reference plane (WxWy plane, WyWz plane, WzWx plane) of the user reference coordinate axis (Wx, Wy, Wz).

Here, the initial value means a value measured when the exercise is initiated. For example, the exercise may be initiated at a predetermined time point after the exercise type is selected. In this case, the user may know the predetermined time point through the visual guidance through the display or the voice guidance through the speaker (e.g., an exercise start guide countdown).

Alternatively, in general, the user preparing a posture for exercise does not move for a predetermined time. If the movement is sensed below a reference value for a predetermined time after the exercise type is selected, the three-dimensional coordinate or the inherent angle measured during the predetermined time may be regarded as the initial value.

In addition, the user-based coordinate system having three axes, namely a front direction By; a direction Bx perpendicular to the front direction By on the reference plane including the front direction By; and a direction Bz simultaneously perpendicular to the front direction By and the direction Bz perpendicular to the front direction, may be defined. At this time, the coordinate system transforming module 210 may calculate linear accelerations Bx, By, Bz of the user-based coordinate system in three axis directions of the user-based coordinate system.

Referring to FIG. 4 again, in Step S400, after the linear accelerations Bx, By, Bz of the user-based coordinate system are calculated, the pattern detecting module 250 detects a pattern of the inherent angles α, β, γ and the linear acceleration Bx, By, Bz during a predetermined period. In addition, in Step S500, the pattern detecting module 250 detects a pattern of the distance from the reference surface to the posture measuring module 100 for a predetermined period.

In this case, the predetermined period may be determined based on the weight of the weight training, the number of times per set, and the number of repetitions. General weight training generally includes the weight, the number of sets per set, and the number of repetitions. For example, if a bench press is repeated three sets, twelve times per set, using a barbell of 60 kg, the user repeats weight training twelve times for the weight of 60 kg and then rests (1 set), repeats twelve times and then rests (2 sets), and repeats twelve times and then rests (3 sets).

Figure 10:
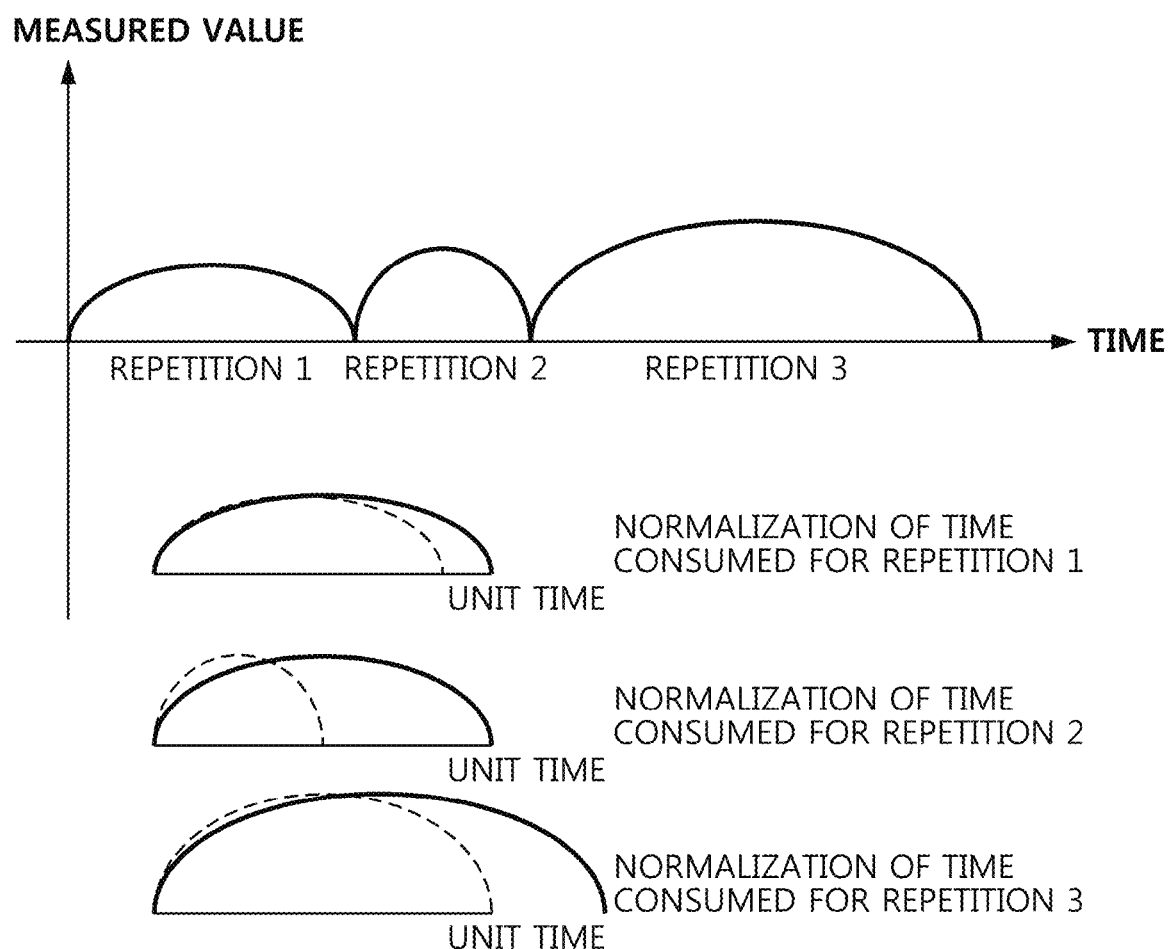
FIG. 10 is a diagram for illustrating normalization of exercise time according to an embodiment of the present disclosure.

Thus, the whole exercise should be analyzed for all sets (three sets as assumed above). Also, as the set is repeated, the probability of detecting an abnormal posture increases due to the exhaustion of fitness. Thus, a pattern of each set may be detected separately. FIG. 10 is a diagram for illustrating normalization of exercise time according to an embodiment of the present disclosure. The time required for each set may be different. In this consideration, the time consumed from start to end of the repeated sets should be normalized and converted into unit time.

According to FIG. 9b, the weight, the number of times per set, and the number of repetitions (the number of sets) may be input from the user by an exercise attribute selection menu 247-2, which is an input interface.

Figure 12:
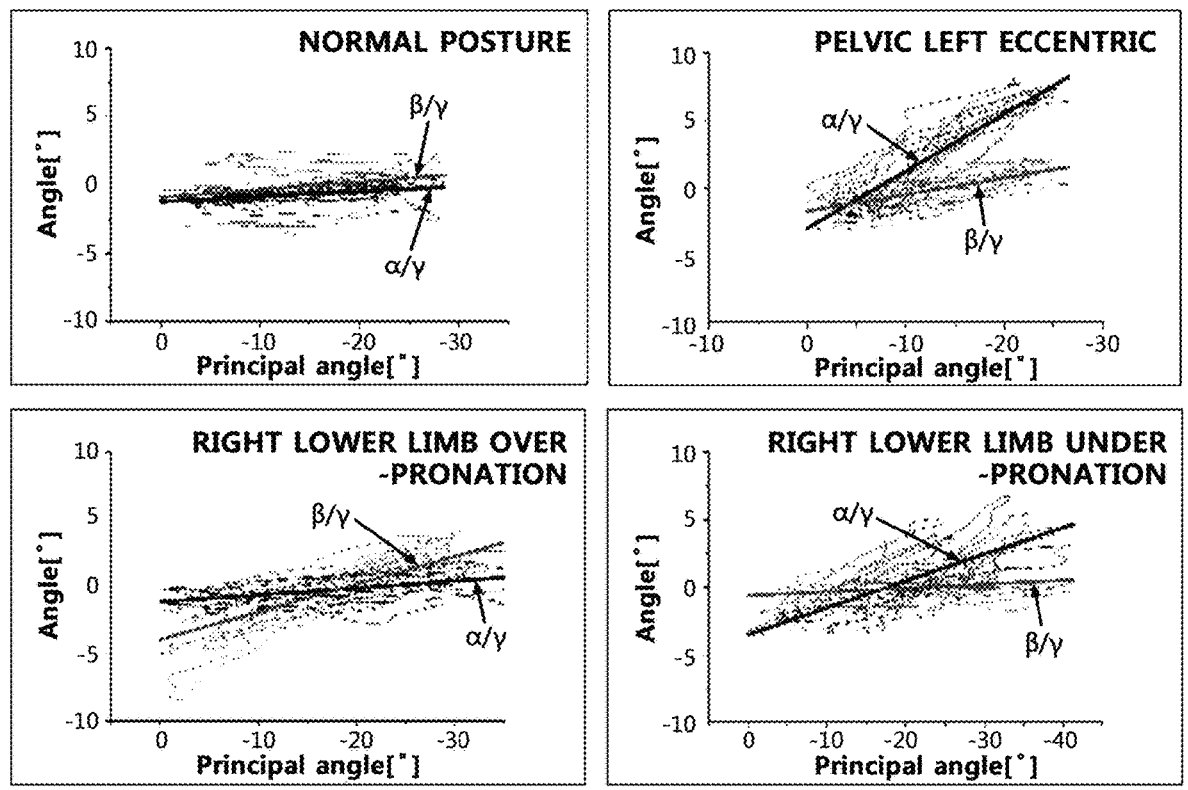
FIG. 12 is a diagram showing a pattern analysis according to an embodiment of the present disclosure.

FIG. 11 is a diagram showing an example of an inherent angle and linear acceleration of each axis on a user-based coordinate system according to an embodiment of the present disclosure, and FIG. 12 is a diagram showing a pattern analysis according to an embodiment of the present disclosure. The pattern detecting module 250 patterns a pattern of the inherent angles α, β, γ and the linear accelerations Bx, By, Bz during a predetermined period as shown in FIGS. 11 and 12.

FIG. 11 is a graph showing an exercise pattern (FIGS. 11a and 11b) based on the user-based coordinate system (B-frame) and the linear accelerations Bx, By, Bz during one set and an exercise pattern (FIGS. 11c and 11d) based on the inherent angles α, β, γ.

Seeing the detected pattern with reference to FIGS. 11a to 11d, during the correct motion (FIG. 11a), while the Z-axis direction Bz of the user-based coordinate system is moved periodically, it is found that shaking in the X axis is very small. However, during the wrong posture (FIG. 11b), while the Z-axis direction of the user-based coordinate system is moved periodically, it may be found that the shaking in the X-axis shows a very large pattern. That is, it may be found that the posture of FIGS. 11b and 11d is a wrong exercise posture having very large shaking in the left and right direction, based on the front side of the user.

As another example of pattern detection, referring to FIG. 12, in the normal squat posture, it may be found that the change β of the bar angle of the barbell and the sensor detachment angle α have similar patterns, but the patterns of the change β of the bar angle of the barbell and the sensor detachment angle α are formed differently in the case of pelvic left eccentric, right lower limb over-pronation and right lower limb under-pronation.

Referring to FIG. 4 again, in Step S600, the pattern detecting module 250 performs posture analysis through pattern classification after pattern detection.

More specifically, the pattern classification may be, for example, performed through the regression analysis of the detected pattern as shown in FIG. 12.

For example, in FIG. 12, the regression analysis is performed to the pattern of the change β of the bar angle of the barbell and the sensor detachment angle α based on the angle γ between the reference surface and the barbell whose angle is changed most greatly from the inherent angle during squat, and the exercise posture and a wrong part may be derived according to the slope and the position of the intersection of two straight lines. That is, the barbell angle pattern may be extracted by analyzing the shape and aspect of the graph.

In this embodiment, the slope-based regression analysis is described as a criterion, but various analysis methods are applicable. For example, the posture analyzing module 200 may analyze and interpret the pattern based on a representative value, namely a maximum value, a minimum value, an arithmetic mean, a harmonic mean, a geometric mean, a quartile, a scatter, a distribution or a center of gravity, of the inherent angles α, β, γ or the linear accelerations Bx, By, Bz in each axis of the user-based coordinate system (B-frame).

Meanwhile, the posture analyzing module 200 may perform the pattern analysis through the graph as shown in the example of FIG. 12.

For example, the posture analyzing module 200 may generate various types of graphs, for example by drawing the above graph during the entire time of the exercise, drawing a graph during one exercise, drawing a graph during one set of exercise, drawing a graph during the total exercise time when normalized to the unit time, drawing a graph of one exercise during the unit time, drawing a graph of one set of exercise during the unit time, or drawing a graph using other measurement values with one element serving as the horizontal axis as described above.

In this case, on the graph derived as above, the posture analyzing module 200 may obtain the slope and offset of the model by, for example, performing linear regression analysis to the graph, or calculate an arc of the graph or an arc center, a short axis length, a long axis length, a slope and an intercept of an ellipse when the graph is approximated to ellipse, analyze each coefficient when Fourier transformation is performed thereto, or analyze the number of coefficient inflection points or peaks and the position or distribution of inflection points when the graph is approximated by a polynomial function, a hyperbolic function, a logarithmic function, a trigonometric function, an exponential function, or a combination thereof.

Alternatively, the pattern may be recognized using a neural networks.

For pattern recognition using the neural network, the following learning is required at the analysis learning server 900.

Figure 13A:
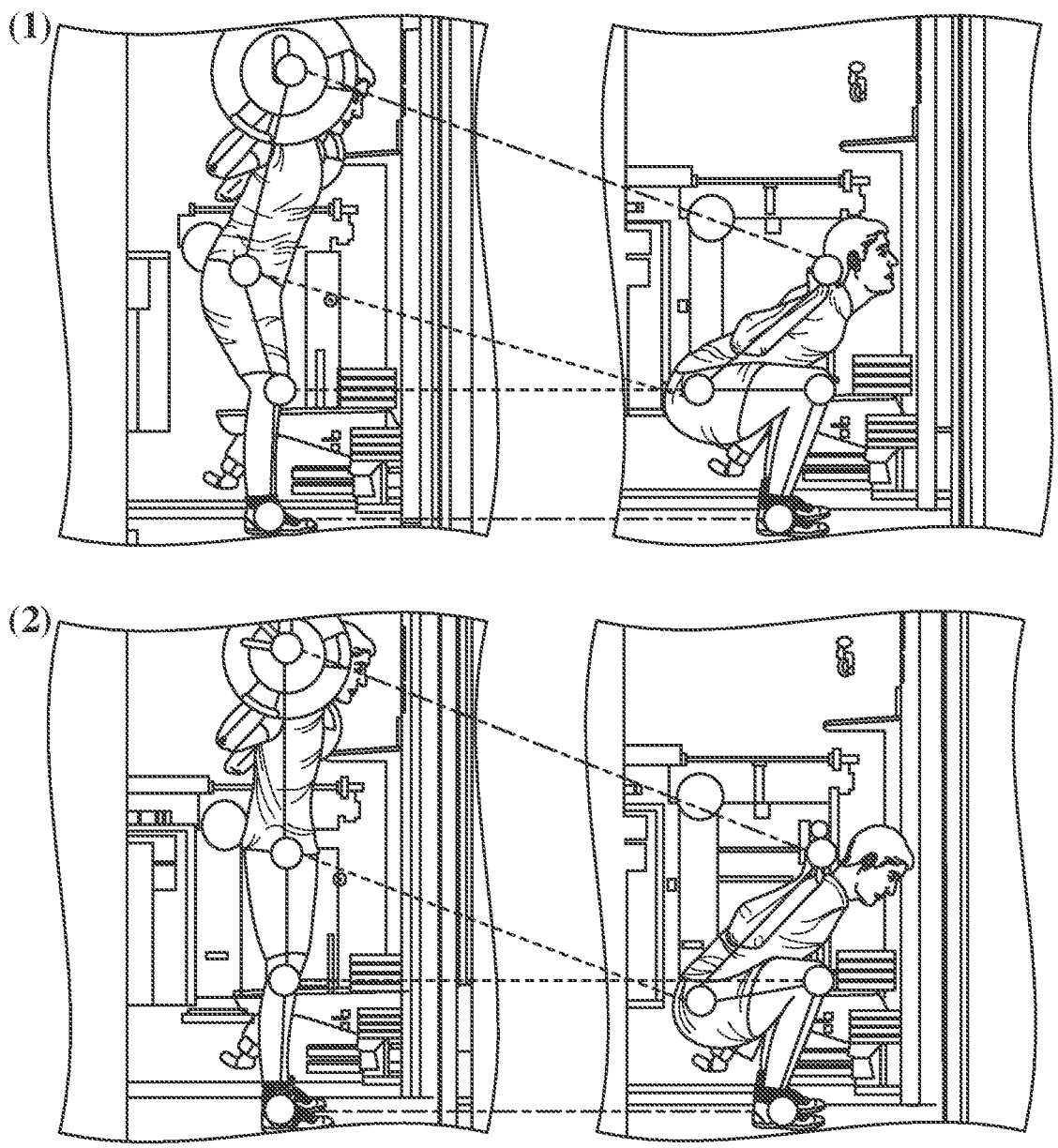
FIGS. 13A to 13C are diagrams for illustrating a machine learning method according to an embodiment of the present disclosure.
Figure 13B:
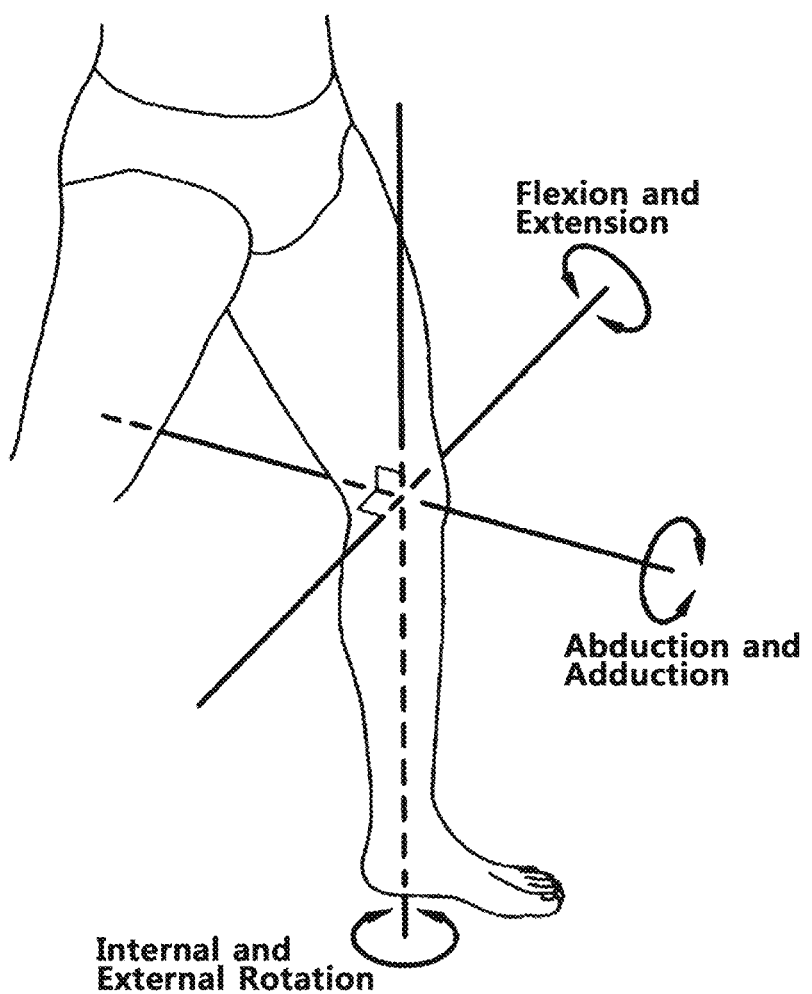
Figure 13C:
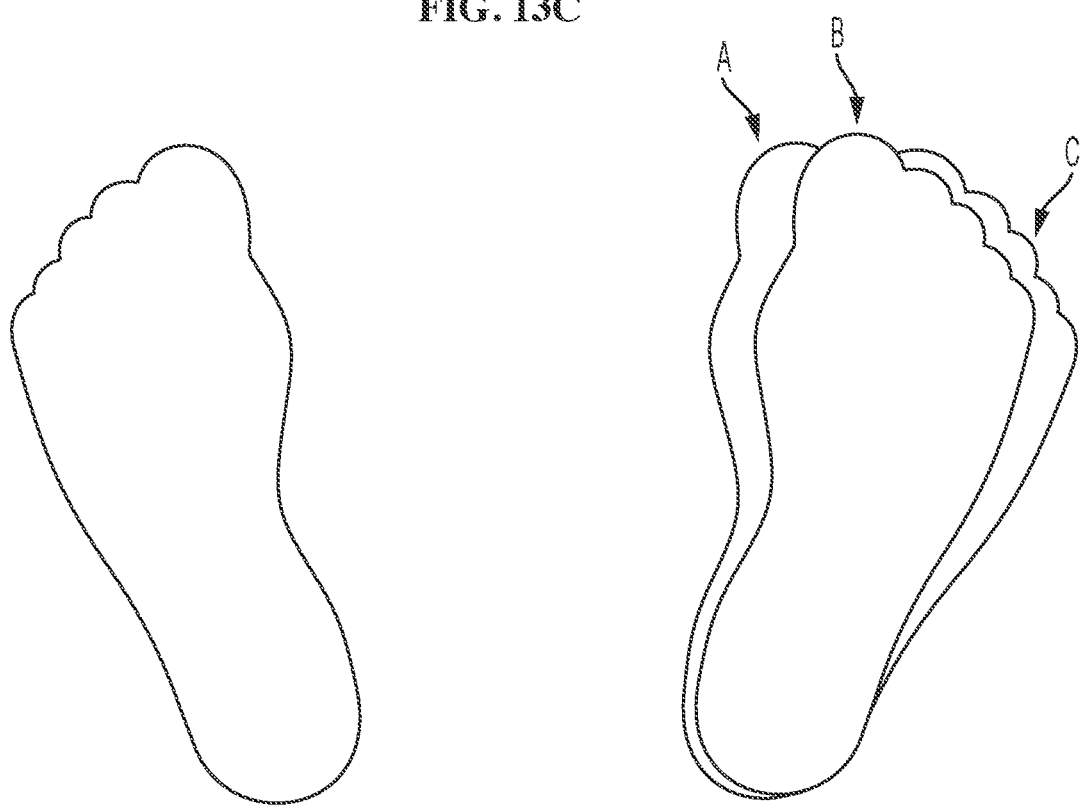
Figure 14:
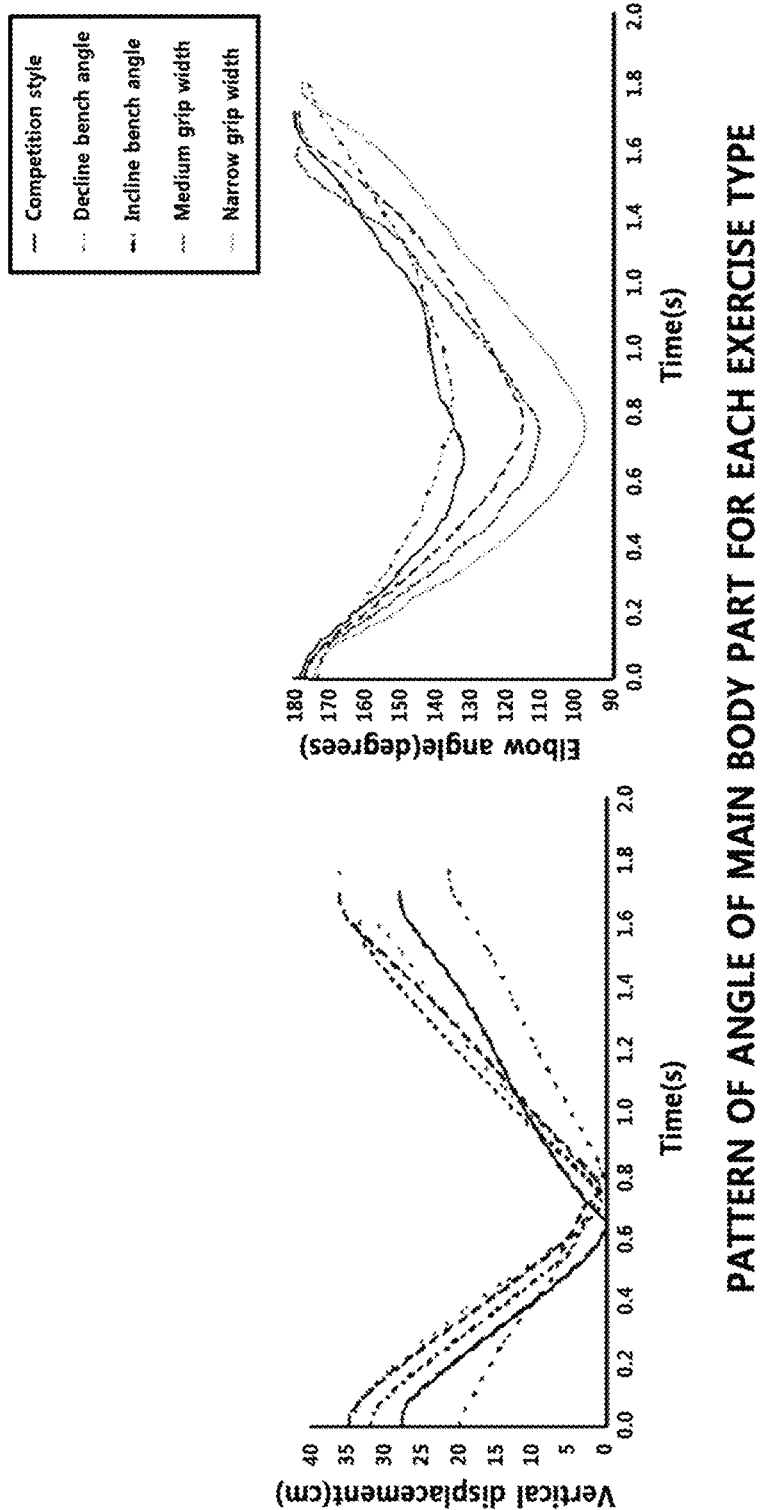
FIG. 14 is a diagram showing an exercise analysis according to an embodiment of the present disclosure.

FIGS. 13a to 13c are diagrams for illustrating a machine learning method according to an embodiment of the present disclosure, and FIG. 14 is a diagram showing an exercise analysis according to an embodiment of the present disclosure.

First, as shown in FIG. 13a, the exercise is analyzed using an exercising motion (a first user exercising posture) that is determined as a correct exercise. For the motion analysis, for example, various angle data such as flexation/extension and abduction/adduction of the knee, or internal/external rotation of the ankle are collected. In this case, various exercise data as shown in FIG. 14 may be collected. At this time, determining whether the exercise is correct may be performed by a motion sensor separate from the sensor module.

In addition, an exercising motion (a second user exercising posture), which is determined as a wrong exercising posture (a second user exercising posture different from the first user exercising posture, for example, in case of squat, pelvic left eccentric, right lower limb over-pronation, and right lower limb under-pronation of FIG. 12), is also analyzed. At this time, various exercise data for the second user exercising posture are also collected as shown in FIG. 14. Even for the wrong exercising motion, it is possible to determine whether it is a wrong incorrect exercise posture through a motion sensor (for example, a motion detection sensor of Kinect) for each major joint that is moved during the exercise. In addition, the motion sensor collects various data such as rotation of each joint or load on each muscle.

For example, referring to FIG. 13c, when the user performs a squat motion by using the barbell, if it is assumed that the case B is an optimized foot angle, the case where the foot angle is bent inward as indicated by A is referred to as over-pronation, and the case where the foot angle is bent outward as indicated by C is referred to as under-pronation.

Thus, by analyzing the motion pattern of users during the weight training using a barbell, motion patterns of subjects may be classified based on patterns for normal posture, pelvic left eccentric, right lower limb over-pronation or right lower limb under-pronation as shown in FIG. 12. In other words, it is possible to determine an abnormal posture of a subject by analyzing which of the patterns in the graph shown in FIG. 12 corresponds to the collected motion patterns of the subjects.

Here, the abnormal posture is a wrong posture that may occur during exercise, and this means a posture that causes an injury (for example, the difference in angle of the knees open during squat) and a posture that reduces the exercise effect (for example, a posture not lowering the dumbbell to the end during biceps exercise), other than the normal posture.

The cases of the subjects with abnormal postures may also be collected to analyze the abnormal postures so as to extract a pattern of the inherent angles of the main body parts and the linear accelerations in user-based coordinate system according to each exercise type.

In this case, as shown in FIG. 13a, during the squat using the barbell, a marker may be attached to the body of the user to reconstruct the body of the subject by using the marker attachment position and marker-related information, and the tension of muscles may be reconstructed using the reaction of the ground to detect a pattern of angles of main body parts. For example, as shown in FIG. 13b, the pattern of angle according to the flexation and extension of the knee may be represented by a graph, and the pattern of angle according to the flexation of the foot and the flexation of the sole of the foot may be represented by a graph.

Figure 15:
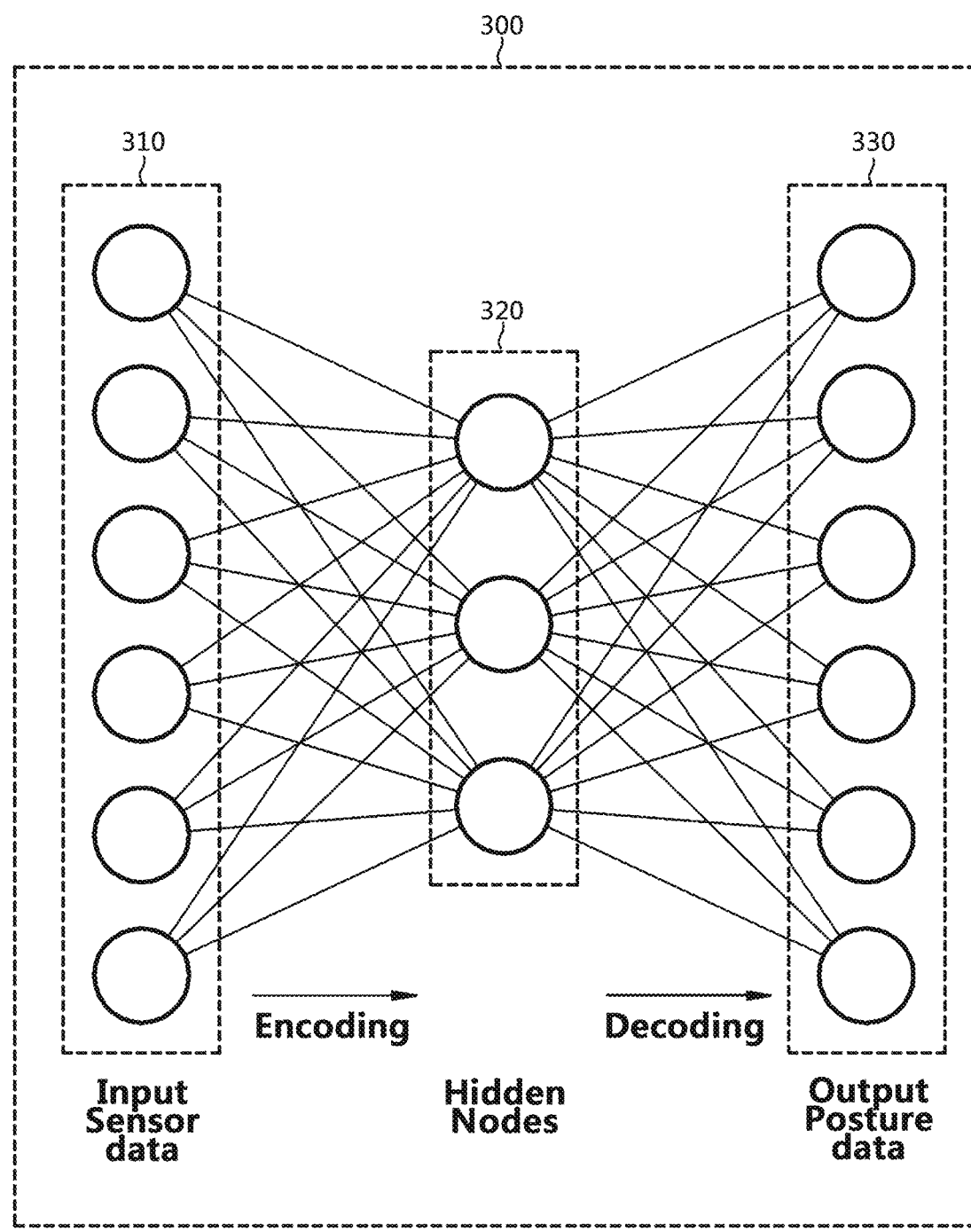
FIG. 15 is a diagram showing a neural network according to an embodiment of the present disclosure.

Meanwhile, the inherent angles α, β, γ or the linear acceleration Bx, By, Bz of each axis in the user-based coordinate system (B-frame) calculated based on the data collected by the motion sensor and the sensor values according to the present disclosure are learned through the neural network. FIG. 15 is a diagram showing a neural network according to an embodiment of the present disclosure. The analysis learning server 900 inputs the graph generated based on the inherent angle or the linear acceleration to an input terminal of the neural network, inputs the graph by the motion sensor to an output terminal of the neural network, and then calculates a motion coefficient (e.g., a coefficient of the neural network) by using the backpropagation method.

After the analysis learning server 900 is sufficiently trained, the pattern detection module 250 of the local posture analyzing module 200 includes the same neural network, and the exercise pattern of the user is figured out by detecting the pattern in real time by the pattern detecting module 250 (whether the exercising posture of the user is correct and what kind of problem is (e.g., right lower limb over-pronation)).

Figure 16:
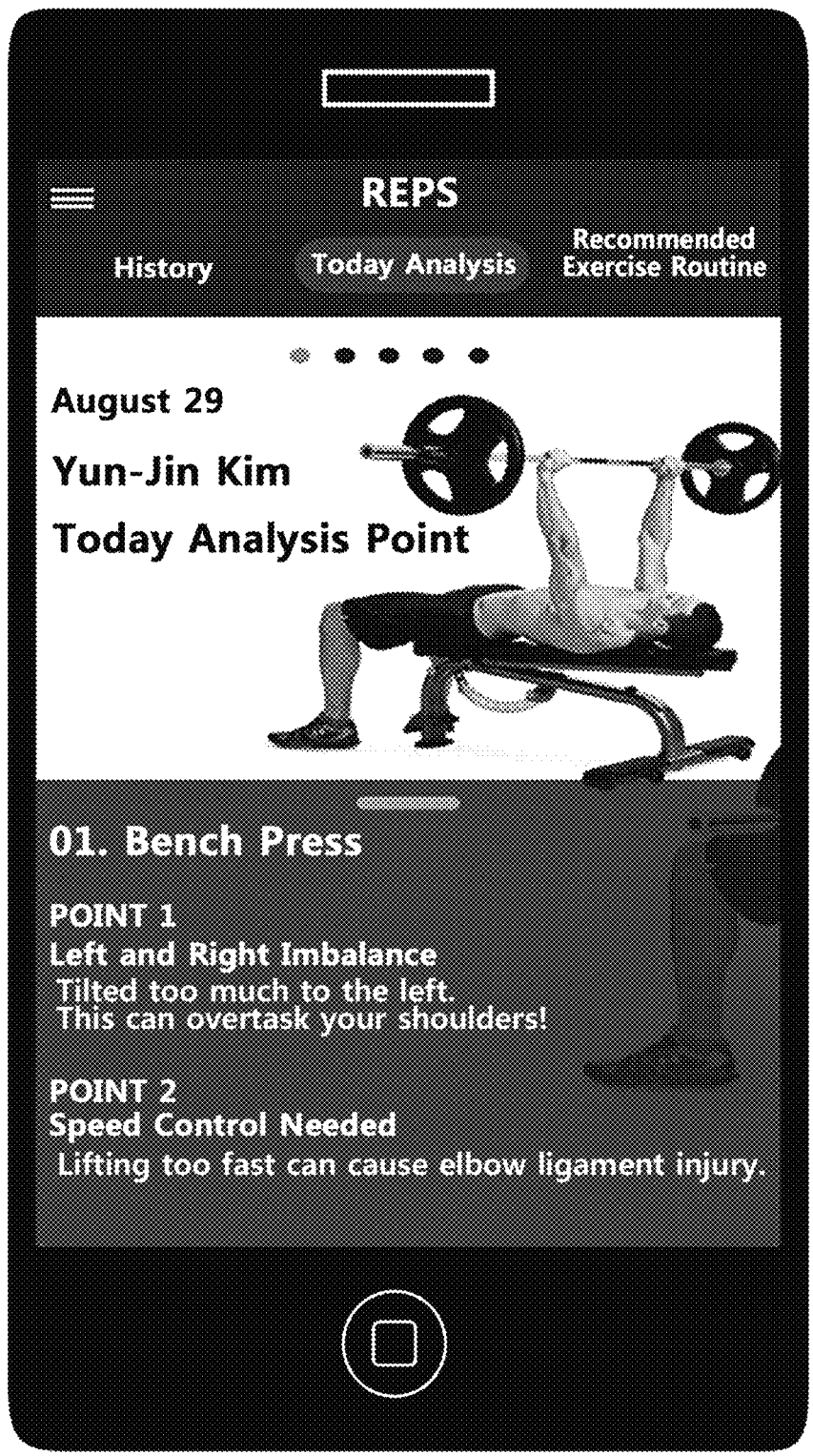
FIG. 16 is a diagram showing guide information according to an embodiment of the present disclosure.

Referring to FIG. 4 again, finally, after the posture analysis, the guide generating module generates a guide phrase or a guide screen according to the detected exercise pattern and transmits the same to the user interface module. FIG. 16 is a diagram showing guide information according to an embodiment of the present disclosure. Exemplary guide text and guide screen are shown in FIG. 16. For example, the guide screen may include correction information for the exercise posture in terms of the left and right balance or the exercise speed. The correction information for the exercising posture may be output to, for example, a wireless earphone or a glasses display by an external output module 249 (see FIG. 2).

Figure 17:
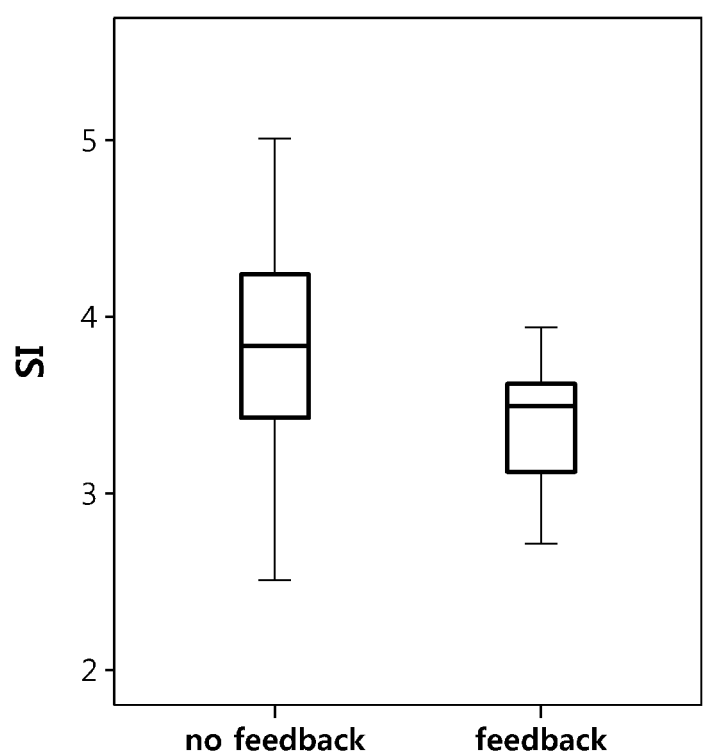
FIG. 17 is a diagram for illustrating an effect obtained by guiding according to the present disclosure.

FIG. 17 is a diagram for illustrating an effect obtained by guiding according to the present disclosure. Referring to FIG. 17, it may be understood that actively informing the user of the real-time analysis and correction information about the squat during weight training is effective in reducing the symmetric index (SI). In other words, it may be found that the symmetry index when the feedback is performed is reduced as shown in FIG. 17 compared to the case where no feedback is performed. That is, if the user is able to immediately receive the correction information during the exercise according to the present disclosure, the exercising posture may be remarkably corrected.

Thus, according to the present disclosure, the user may the check and evaluation for the correct posture in real time by identifying the cause of an abnormal posture according to the motion pattern analysis of each exercise type.

Also, in the present disclosure, it is possible to improve the accuracy of exercising motion analysis by mapping the sensor data pattern and the motion analysis data for each abnormal posture through machine learning.

In addition, in the present disclosure, it is possible to perform accurate exercising motions without the constraints of space and time and expert assistance by receiving an audiovisual notification by the posture measuring module 100 or an application.

Though the embodiments of the present disclosure have been described in more detail with reference to the accompanying drawings, the present disclosure is not necessarily limited to these embodiments, and various modifications may be made without departing from the technical scope of the present disclosure. Accordingly, the embodiments disclosed in the present disclosure are not intended to limit the technical features of the present disclosure but to explain the technical features, and the scope of the present disclosure is not limited by these embodiments. Therefore, it should be understood that the embodiments described above are exemplary in all respects and not restrictive. The scope of the present disclosure should be construed by the appended claims, and any technical idea falling within the equivalent scope of the present disclosure shall be construed as being included in the scope of the present disclosure.

What is claimed is:

1. A posture coaching method for weight training, comprising:
    sensing an exercising motion of a user by a sensor module that is attached to a part of the body of the user or exercise equipment gripped by the user for exercising;
    calculating an inherent angle of the sensor module and a linear acceleration of each axis of a user-based coordinate system based on the user by using the sensed value;
    analyzing an exercising posture of the user by detecting and classifying a pattern of the linear acceleration and the inherent angle; and
    generating exercising posture correction data based on the classified pattern;
    wherein the sensor module includes a geomagnetic sensor, a gyro sensor and an acceleration sensor, and
    wherein the step of calculating an inherent angle of the sensor module and a linear acceleration of each axis of a user-based coordinate system based on the user includes calculating the inherent angle based on a quaternion calculated based on sensor values measured by the geomagnetic sensor, the gyro sensor and the acceleration sensor and calculating a front direction of the user according to an initial value sensed by the sensor module and deriving each axis of the user-based coordinate system based on the calculated front direction.

2. The posture coaching method for weight training according to claim 1,
    wherein the sensor module includes a distance sensor, and
    wherein the posture coaching method further comprises:
    calculating a distance from a reference surface based on the distance sensor; and
    detecting a distance pattern from the reference surface.

3. The posture coaching method for weight training according to claim 1,
    wherein the front direction is derived to be present on a reference plane of a user-based coordinate system that is derived by the geomagnetic sensor.

4. The posture coaching method for weight training according to claim 1,
    wherein the front direction is derived based on an exercise type input by the user and the sensed initial value.

5. A posture coaching method for weight training, comprising:
    sensing an exercising motion of a user by a sensor module that is attached to a part of the body of the user or exercise equipment gripped by the user for exercising;
    calculating an inherent angle of the sensor module and a linear acceleration of each axis of a user-based coordinate system based on the user by using the sensed value;
    analyzing an exercising posture of the user by detecting and classifying a pattern of the linear acceleration and the inherent angle; and
    generating exercising posture correction data based on the classified pattern;
    wherein the sensor module includes a geomagnetic sensor, a gyro sensor and an acceleration sensor, and
    wherein the step of calculating an inherent angle of the sensor module and a linear acceleration of each axis of a user-based coordinate system based on the user includes calculating the inherent angle based on a quaternion calculated based on sensor values measured by the geomagnetic sensor, the gyro sensor and the acceleration sensor;
    wherein the step of analyzing an exercising posture of the user by detecting and classifying a pattern of the linear acceleration and the inherent angle includes:
    sensing a first user exercising posture by a motion sensor and the sensor module;
    sensing a second user exercising posture by a motion sensor and the sensor module;
    obtaining a motion coefficient by calculating through a neural network the data collected in the steps of sensing the first and second user exercising postures by the motion sensor and the sensor module; and
    detecting and classifying a pattern of the linear acceleration and the inherent angle based on the motion coefficient.

6. The posture coaching method for weight training according to claim 5,
    wherein the step of obtaining a motion coefficient obtains the motion coefficient by means of backpropagation by inputting the data obtained by sensing the first user exercising posture and the second user exercising posture by the motion sensor into an input terminal of the neural network and inputting the data obtained by sensing the first user exercising posture and the second user exercising posture by the sensor module into an output terminal of the neural network.

7. A posture coaching system for weight training, comprising:
    a posture measuring module having a sensor module attached to a part of the body of a user or exercise equipment gripped by the user for exercising to sense an exercising motion of the user;
    a pattern detecting module configured to calculate an inherent angle of the sensor module and a linear acceleration of each axis of a user-based coordinate system based on the user by using the sensed value and to analyze an exercising posture of the user by detecting and classifying a pattern of the linear acceleration and the inherent angle; and
    a posture analyzing module having a guide module configured to generate exercising posture correction data based on the detected and classified pattern;
    wherein the sensor module includes a geomagnetic sensor, a gyro sensor and an acceleration sensor; and
    wherein the pattern detecting module further configured to calculate the inherent angle based on a quaternion calculated based on sensor values measured by the geomagnetic sensor, the gyro sensor and the acceleration sensor, calculate a front direction of the user according to an initial value sensed by the sensor module and derive each axis of the user-based coordinate system based on the calculated front direction.

* * * * *